FIELD DATA WHERE THE CDP TRACES
HAVE BEEN STACKED
CONVENTIONALLY

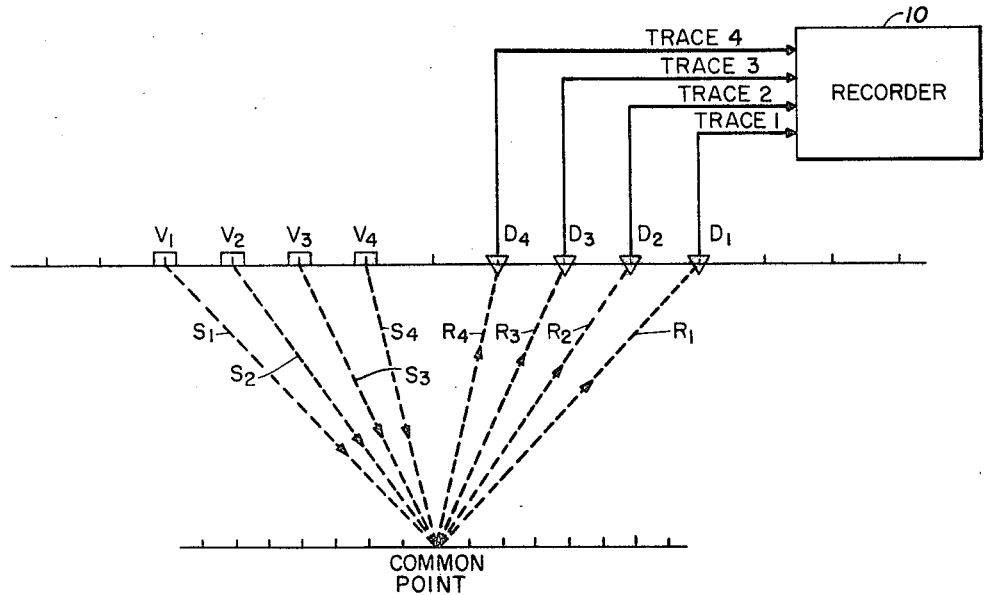
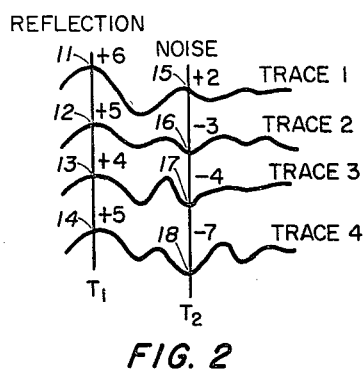
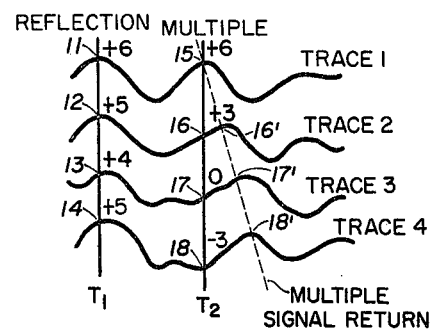

FIELD DATA WHERE THE CDP TRACES
HAVE BEEN PROCESSED
USING OUR INVENTION

Inventors
DOUGLAS S. SULLIVAN
PAUL G. MATHIEU

By William J. Miller

Attorney

United States Patent Office 3,496,531
Patented Feb. 17, 1970

3,496,531
METHOD AND APPARATUS FOR DETERMINING AND APPLYING A GAIN FUNCTION
Douglas S. Sullivan and Paul G. Mathieu, Ponca City, Okla., assignors to Continental Oil Company, Ponca City, Okla., a corporation of Delaware
Filed Aug. 2, 1968, Ser. No. 749,723
Int. Cl. G01v 1/00
U.S. Cl. 340—15.5           9 Claims

ABSTRACT OF THE DISCLOSURE

Method for enhancing the coherent events between related traces in the presence of noise, or noise in the form of multiple reflection, the method consisting of dividing a plurality of related traces into time increments and, at each time increment, the mathematical mean of the events is determined for that sample point; the difference between each trace at the mean is determined and then the total of the difference obtained is summed. The gain or attenuation of the recorded traces is adjusted at that time in accordance with the reciprocal of the above-determined result. The results may be further altered by raising the reciprocal to some predetermined power.

DESCRIPTION OF THE PRIOR ART

An extreme amount of effort has gone into the development of methods and apparatus for generating and receiving seismic data. Better methods have been developed for generating seismic signals not only in the specific apparatus for creating the seismic signals but for methods of applying the signals to the ground so that better data can be received. Further efforts have been made in detector placement and detector apparatus in an effort to eliminate undesired signals and receive the desired signals with less distortion and less noise than even before possible. With the improvement in the transmission and reception of seismic signals, it becomes equally important to process the data obtained from these signals in a manner so that the geologists can interpret with better accuracy the critical areas where oil might be deposited or trapped.

Devices in the past have emphasized large amplitude data and de-emphasized small amplitude data on the theory that large acoustical discontinuities would produce large amplitude events. This type display, however, has problems because the large amplitude events may or may not be the events that should be emphasized, while the small amplitude events may in fact be carrying the critical information from the stratum under investigation. Under the above conditions, the records tend to become clouded with data being emphasized that has little or no importance and may in fact tend to cause the interpreter to misinterpret the records.

BRIEF DESCRIPTION OF THE PRESENT INVENTION

This invention provides a method for analyzing the data from a plurality of detectors, positioned to receive information from a common basement point, and displaying the information so analyzed in a manner to emphasize the occurrence of events which are aligned in time and amplitude in each of the related detector traces, and de-emphasize the occurrence of events which are misaligned in time and/or dissimilar in amplitude even though aligned in time. This invention is best applied, but not limited, to the type of data acquired by the technique known as "common depth point stacking," or "CDP," which data is acquired by generating a seismic signal and receiving the detected signal; repositioning the generator and receptor such that the new signal, when generated and received, will be reflected off the same vertical portion on a subterranean strata as was the first signal. As many signals as practical can be generated and received along different paths in order to acquire a plurality of transmissions, all being reflected off the common vertical point on the subterranean strata. Each of the detected signals is then received and recorded in the usual manner. The received and recorded signals are then processed in such a way that when the amplitudes of an event all have the same polarity and all occur in substantially the same point in time for each trace under consideration, that maximum amplification will be applied to the average of these pulses when recorded. When a plurality of related events from a reflection are different in amplitude or polarity, or when the amplitudes occur at a different point in time, the average of the amplitudes of the event from this reflection will be given a minimum amplification prior to recording. The device can be likened to an automatic volume control which varies incrementally with time, depending upon the coherence of the group of traces of related seismic records.

It is therefore an object of this invention to provide a time variant automatic volume control which will permit a signal to pass with little or no attenuation when related events on a plurality of related records have the same polarity, and time occurrence and a minimum gain to the recorded signal when a plurality of related events on a plurality of related records has dissimilar amplitude polarity, or time occurrence.

It is a further object of this invention to sample the output from a plurality of detectors and compare the polarity and time occurrence of an impulse from a common subterranean strata as received by said detectors and give minimum attenuation when the impulses from a stratum are the same in amplitude and time occurrence, and a maximum attenuation when the amplitude detected by said plurality of detectors from some oher source causes an impulse that varies in polarity or in time occurrence.

In addition to the foregoing specifically enumerated objectives, additional objectives and advantages will become apparent as the following detailed description of the invention is read in conjunction with the accompanying drawings.

BRIEF DESCRIPTION OF THE FIGURES

FIG. 1 is a schematic showing of the method for obtaining data from a common basement point;

FIG. 2 is a drawing used to illustrate the operation of the invention with a coherent event between related traces in the presence of noise;

FIG. 3 is a drawing used to illustrate the operation of the invention with a coherent event between related traces in the presence of noise such as a multiple;

DETAILED DESCRIPTION OF THE PREFERRED METHOD AND APPARATUS OF THE INVENTION

Figure 4:
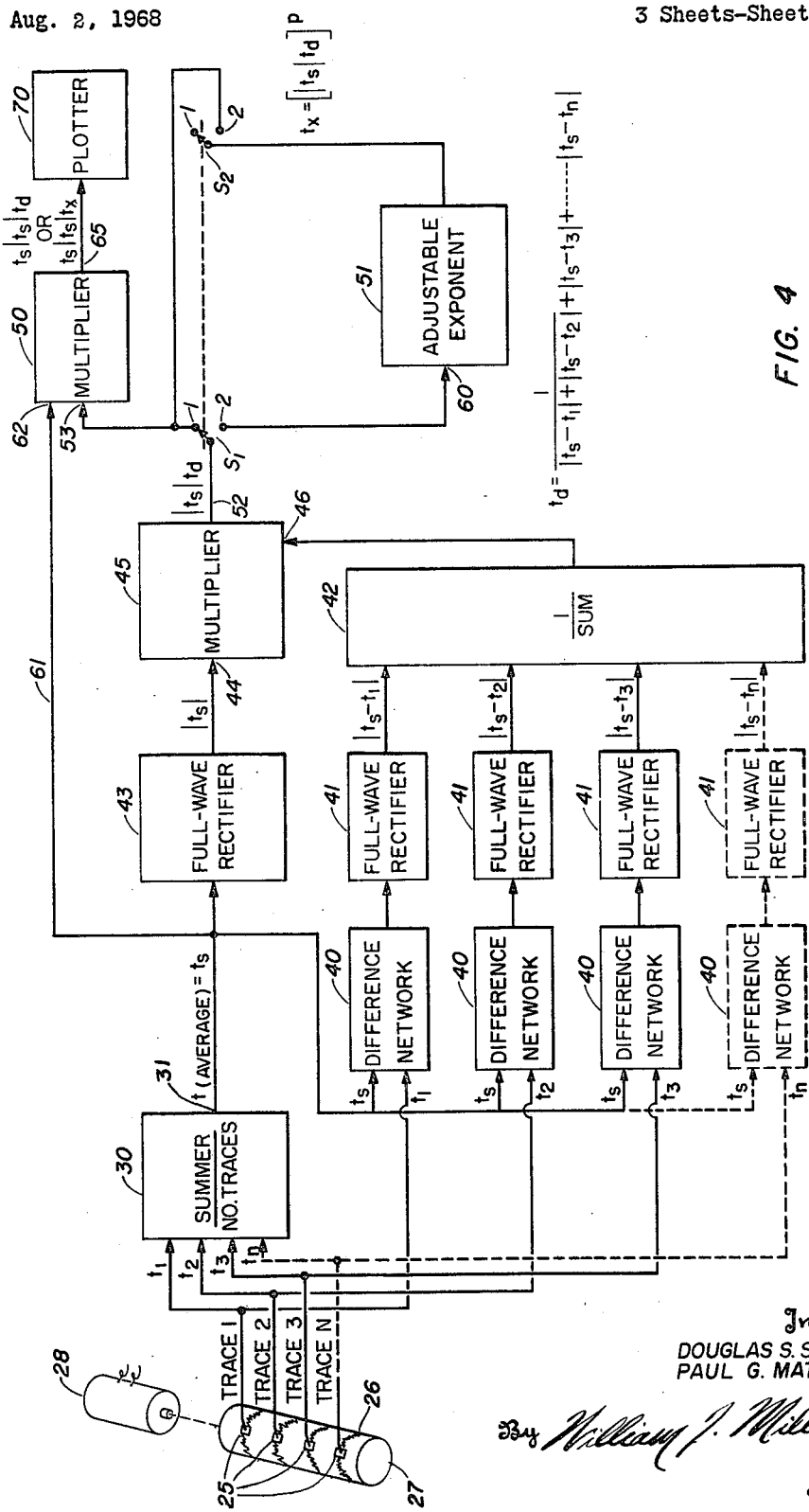
FIG. 4 shows a block diagram of the apparatus necessary for controlling the amplitude of the signals from the input to the recording system.

This invention is particularly useful for processing data from a procedure called "common depth point stacking," or "CDP." However, the invention is not limited to the above method of obtaining data. Any data may be processed in accordance with this system if the normal move-out, dip, etc., corrections are made prior to processing in accordance with this invention, since the primary purpose of this invention is to enhance the desirable or lined-up events and eliminate all other events. Thus, if the normal moveout and dip and other necessary corrections to the data have been made prior to processing, then the events will be properly aligned so that the invention can be useful in emphasizing those events that are lined up.

In the case where data is taken in accordance with the seismic exploration technique known as common depth point stacking, or "CDP," the data so obtained is closely related as a consequence, this invention becomes particularly useful in enhancing the lined up events.

CDP requires that the transmitter and detector be positioned in such a manner that data will be received from a common basement point. Normally, as many as 10 transmissions are performed over one common basement point. The data received from the transmissions are generally added together so that the impulses from the subterranean strata will be added and the noise (which is random) will be attenuated. Common depth point stacking, however, will provide limited attenuation of a misaligned coherent event, such as a multiple, for example.

The normal procedure for obtaining records using the common depth point stacking technique is shown in FIG. 1. A generator, such as a hydraulic vibrator, a heavy weight, dynamite, or other seismic source, generates a signal $S_1$ from position $V_1$. Signal $S_1$ is reflected from a common basement point 9 and travels back through a return path $R_1$ to detector $D_1$, and recorded on a recorder 10 as trace 1. Next the generator is moved to position $V_2$; the detector to position $D_2$, and a seismic signal $S_2$ is generated into the ground at $V_2$ and reflected off the same common point 9, returning through path $R_2$ to detector $D_2$ and recorded as trace 2. Subsequent transmissions are made at positions 3 and 4, generating signals $S_3$ and $S_4$. Each will reflect off the common basement point 9 and return as signals $R_3$ and $R_4$, respectively, being received by detectors $D_3$ and $D_4$ and recorded as traces 3 and 4 on recorder 10. It is obvious, of course, that any procedure or order of transmitting and reception can be used just so long as the signal being transmitted and received is from the same common basement point.

Referring to FIGURES 2 and 3, the signal received as traces 1, 2, 3 and 4 is shown. It is obvious, of course, that the traces shown here are for illustrative purposes only, and as such, are drawn to clearly illustrate the characteristics of this invention. Actual seismic traces would have much larger time duration. Each signal representing trace 1, 2, 3 and 4 in FIGURES 2 and 3 has already been corrected for step-out; thus, the difference in arrival time at detectors 1, 2, 3 and 4, caused by the physical replacement of the detectors at different distances from the common basement point, has been corrected; therefore, the primary reflection points 11 for trace 1, 12 for trace 2, 13 for trace 3, and 14 for trace 4, will occur substantially at time $T_1$. Selecting some other arbitrary point in time, such as, for example $T_2$, a plurality of other signal amplitudes are noted, 15 for trace 1, 16 for trace 2, 17 for trace 3, and 18 for trace 4. Since for the purposes of this illustration, the point $T_2$ does not represent a reflection from a common basement point, the return will constitute random or incoherent noise and is so labeled.

In FIG. 3, the amplitudes occurring at $T_1$ for each of the traces are numbered similarly 11 through 14, respectively. Likewise, the signal arriving at $T_2$ is labeled 15 through 18, respectively; however, since the amplitudes at points 15 through 18 are the result of a multiple, the maximum amplitude of the multiple will not arrive at each of the traces 1 through 4 at the same time $T_2$ but will arrive along a sloping time labeled "Multiple Signal Return," illustrating that coherent noise such as a multiple will arrive at each of the traces at a slightly different time. This invention then will take signals as illustrated in FIG. 2 and emphasize the reflection impulses occurring at time $T_1$ and de-emphasize the signals occurring randomly at $T_2$. The invention will also minimize multiples that occur on each trace when the multiples arrive at a slightly different time at each detector.

The main characteristic of the method of this invention is that a weighting coefficient is computed for the common depth point composite of a plurality of traces, e.g., traces 1 through 4 of FIG. 2. This coefficient will be the function of the group coherence as measured by the combined differences between the trace amplitudes and their mean amplitude at each sample point, such as, for example, $T_1$, $T_2$, etc. This coefficient is computed for every sample point of the composite trace. The method for performing the computation of the coefficients is illustrated below.

If we described the common depth point traces as follows:

$a_{11}$, $a_{21}$, $a_{31}$ . . . $a_{m1}$
$a_{12}$, $a_{22}$, $a_{32}$ . . . $a_{m2}$
$a_{13}$, $a_{23}$, $a_{33}$ . . . $a_{m3}$
. . . . .
$a_{1n}$, $a_{2n}$, $a_{3n}$ . . . $a_{mn}$ where "$n$" is the number of common depth point parts of traces added together to make the total, and "$m$" is the number of samples taken along these traces in time, and "$a$" is the amplitude of the trace in question at the sample time. At every sample point, the sum of the elements is obtained; e.g., the amplitudes of each trace 1 through 4 at $T_1$ (11, 12, 13, respectively) are summed:

$$S_j = \sum_{i=1}^{n} a_{ji} \quad j=1, 2, 3 \ldots m$$

where "$j$" is the point (e.g., $T_1$ in FIG. 2) where the sum is being computed in time and "$i$" is the trace number, i.e., 1 through 4 in FIG. 2. From the above, the mathematical mean is then computed at every sample point, as shown below.

$$\bar{a}_j = S_j/n \quad j=1, 2, 3 \ldots m$$

From the arithmetic mean, the difference must then be computed between each common depth point trace and the common depth point mean. Then the absolute values of these differences are summed as shown below $$d_j = |\bar{a}_j - a_{j1}| + |\bar{a}_j - a_{j2}| + |\bar{a}_j - a_{j3}| + \ldots |\bar{a}_j - a_{jn}|,$$
$$j=1, 2, 3 \ldots m$$

$$d_j = \sum_{i=1}^{n} |\bar{a}_j - a_{ji}| \quad j=1, 2, 3 \ldots m$$

If the reciprocal of the summed differences $|d_j|^{-1}$ is then taken, it may then be applied as a weighting coefficient to the stacked trace so that the final output $(O_j)$ will become $$O_j = |S_j| \, |d_j|^{-1} \quad \text{where } j=1, 2, 3 \ldots m$$

The effect of the above is to attenuate strongly those events that have large amplitude differences between each trace and the means $\bar{a}_j$ for the group and will attenuate very much less those events which are coherent, as illustrated by the events 11 through 14 at $T_1$ on traces 1 through 4, FIG. 2 and FIG. 3.

EXAMPLE 1

A straight common depth point addition or stacking of the events at time $T_1$ and $T_2$ would give for the primary at $T_1$:

$$S_j = 20$$

and for the noise at $T_2$:

$$S_k = -12$$

So our signal-to-noise ratio would be approximately 2:1. Following the teachings of this invention, the signal-to-noise ratio would be greatly enhanced as below illustrated. If the sum of the differences from the mean is computed:

for the Primary at $T_1$:

$$d_j = +|5-6|+|5-5|+|5-4|+|5-5| = 2$$

for the Noise at $T_2$:

$$d_k = |-3-2|+|-3+3|+|-3+4|+|-3+7| = 10$$

Then the reciprocal of the above would be our weighting co-efficient on the output trace for the Primary at $T_1$: $O_j = (S_j)(d_j)^{-1} = (20)(1/2) = 10$ for the Noise at $T_2$:

$$O_k = (S_k)(d_k)^{-1} = (-12)(1/10) = -1.2$$

and the signal-to-noise ratio is about 8:1, which is a considerable improvement over the straight common depth point stacking.

EXAMPLE 2

The same type of improvement can be obtained in the ratio between a lined up coherent event or primary, and a misaligned coherent even or multiple. Referring to FIG. 3, the primary amplitudes 11 through 14 for traces 1 through 4 are shown while the maximum amplitudes of the multiple occur at 15′, 16′, 17′ and 18′ for traces 1 through 4, respectively. For sampling purposes, at time $T_2$ the amplitudes will, however, then be 15 through 18, respectively.

A straight stack for the primary return at $T_1$ equals 20 and a straight stack for the multiple at $T_2$ equals 6, or a primary to multiple ratio, 3:1. Using the teachings of this invention, however, "$d_j$," like the previous example, would equal 2, and "$d_k$" would equal absolute value, as set out below.

$$d_k = |+1.5-6|+|1.5-3|+|1.5+0|+1.5+3|$$
$$= |4.5|+|1.5|+|1.5|+|4.5| = 12$$

Thus:

Primary at $T_1$: $O_j = (S_j)(d_j)^{-1} = (20)(1/2) = 10$
Multiple at $T$: $O_k = (S_k)(d_k)^{-1} = (6)(1/12) = .5$ giving a primary to multiple ratio of 20:1.

The method as above illustrated will provide a sharper stand-out primary reflection.

MODIFICATION

The method can be further improved to make the primary reflection stand out a variable by raising the output to a power using the following expression:

$$O_j = (S_j)(d_j)^{-p}$$

If a sharper stand-out is desired, "$p$" can be made greater than 1 and if less stand-out is wanted, "$p$" can be made smaller than 1.

For any percentage error, large amplitude events could have greater differences between the parts and their mean than low amplitude events, even if the low amplitude events were to be incoherent. In other words, the weighting co-efficient functions might tend to favor low amplitude events. In order to compensate for this, the weighting coefficients are multiplied by the absolute value of the mean and the final output trace is as follows:

$$O_j = (S_j)\bar{a}_j(d_j)^{-p}$$

Figure 5A:
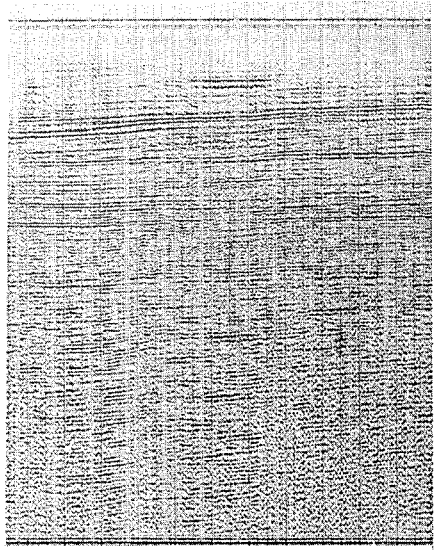
FIG. 5 and FIG. 5B show a comparison of a seismic record where the field CDP data has been stacked conventionally and using the techniques disclosed herein.
Figure 5B:
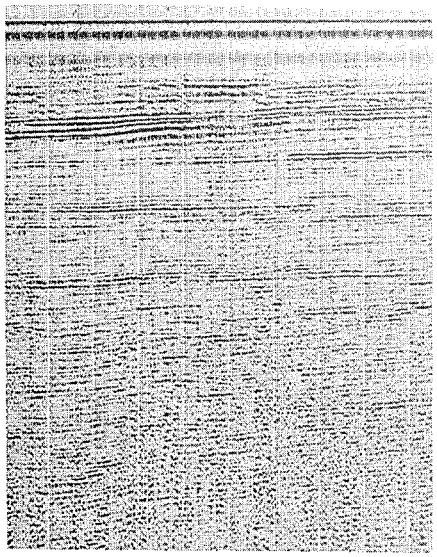

The method as described above has been tested on field data and the results are clearly demonstrated in FIGURES 5A and 5B. A vast improvement can be noted in the coherent events by carefully examining the process data 5B, versus the data shown in FIG. 5A. In the case of the data in 5B, an exponent "$p$" of 1.5 was used. The process as above described can also be varied by applying weighting coefficients to each of the traces at $T_1$, $T_2$, etc., before computing.

DESCRIPTION OF APPARATUS

Referring to FIG. 4, an apparatus useful in performing the above method is disclosed. A plurality of pickup heads 25 is positioned above each of the recorded traces 26. A recorder drum 27 has a band or belt of magnetic recording material mounted thereon. The magnetic belt has recorded thereon a plurality of magnetic traces 26. As drum 27 is rotated by some device such as motor 28, magnetic information is picked up from traces 26 by magnetic heads 25 and transferred through a plurality of wires to a plurality of inputs to a summer 30. Summer 30 is the type that averages each of the input signals $T_1$, $T_2$, $T_3$ ... $T_n$ and has at an output 31, an output voltage equal to the average of each of the input signals, hereafter referred to as $t_s$. Such a summing device 30 is fully disclosed in the "Reference Data for Electrical Engineers," 4th edition, published by International Telephone and Telegraph, on page 458. The signals from magnetic heads 25 are also applied to an input of each of a plurality of difference networks 40. A second input of each difference input network 40 is connected to the output 31 from summer 30. Each of the outputs from the difference input networks 40 is then applied to an input of a full wave rectifier 41 and each of these outputs in turn is applied to a reciprocal network 42. The output signal $t_s$ from summer 30 is applied also to an input of a full wave rectifier 43 whose output is connected to an input 44 of a multiplier 45. The output circuit from reciprocal network 42 is connected to a remaining input 46 of multiplier 45. The output from multiplier 45 can then be applied to one of two circuits, either to a multiplier 50 or to and adjustable exponent network 51. The selection is made through a pair of coupled switches $s_1$ and $s_2$. When switches $s_1$ and $s_2$ are in position 1, the output 52 from multiplier 45 will be applied to input 53 of multiplier 50. When switches $s_1$ and $s_2$ are in position 2, output 52 through wire 52 is applied to the input 60 of adjustable exponent circuit network 51. The output is applied through switch $s_2$, position 2 to the input 53 of multiplied 50. The average signal $t_s$ is also applied through wire 61 to input 62 of multiplier 50 and the output 65 for multiplier 50 is applied to plotter 70.

OPERATION OF CIRCUIT IN FIG. 4

Figure 6:
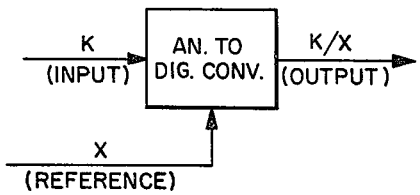
FIG. 6 shows one means useful in obtaining a ratio of two values.

The recorded signals 26 on drum 27 are picked up by detector heads 25 and applied as electrical signals to summer network 30. Network 30 adds the signals $t_1$, $t_2$, $t_3$ ... $t_n$ and divides the added signals by the number of inputs. Therefore at the output, a voltage representative of the average voltage $t_s$ is produced. The input signals $t_1$, $t_2$, $t_3$ ... $t_n$ are also applied as inputs to individual difference networks 40 along with the average signal. Since for our purposes, the absolute value of the difference is required, a full wave rectifier 41 is utilized; thus, regardless of the polarity of output voltage from difference network 40, the full wave rectifier will always present the absolute value at its output. Each of the signals $|t_s|t_1$, $|t_s|t_2$, $|t_s|t_3$, $|t_s|t_n$, are applied to corresponding inputs of the reciprocal summer 42. This circuit is further shown in FIG. 6. If, for example, the input is made to equal 1 and each of the inputs are applied as a reference signal, the output will be the reciprocal. An alternate circuit to that shown can be any straight summing network and the output from the summing network can be put into the device shown in FIG. 6 so that the output will be the reciprocal of the sum. The operation of the device in FIG. 6 as a reciprocal network is a simple analog-to-digital converter. Such a device is described in an article titled "Mathematical Approach to Hybrid Computing," by George Birkel, Jr., Radiation, Inc., Melbourne, Florida. Also see the article, "Scaling Linearizing and Calibration of Data," by George Birkel, Jr., presented at ISA Instrument-Automation Conference and Exhibit, September 1961, Los Angeles, Calif., page 2, under the heading "Scaling." The use of A-to-D converter for the obtaining of ratios is well known.

The output from the reciprocal network 42 $t_d$ will then equal $$t_d = \frac{1}{|t_s-t_1|+|t_s-t_2|+|t_s-t_3|+\ldots|t_s-t_n|}$$

which is then applied to the multiplier at input 46. The average voltage $t_s$ from summer 30 is also applied to a full wave rectifier 43 to convert $t_s$ to absolute value. $|t_s|$ is then applied to the input 44 of multiplier 45. The output from multiplier 45 will represent the product of the average $|t_s|t_d$. With switch $s_1$ in position 1, output from wire 52 will then be applied to the input 53 of multiplier 50 along with $t_s$. The output and the multiplier will then be $|t_s|t_s|t_d$ which will then be plotted. Under these conditions, the plotter is then plotting the average of the sums of the three or more input traces which, under these conditions, would represent the average of the sum of the traces taken from a common depth point. The value $t_d$ will vary, depending upon the alignment of the traces. If the traces are fully aligned, the arithmetical value of $t_s \cdot t_d$ will have little effect on $t_s$. However, if the portion of the trace being sampled is badly misaligned or noisy, the arithmetical value (absolute value) of $t_s \cdot t_d$ will be small. Therefore, it will minimize the amplitude plotted for that particular value of $t_s$. It is obvious that the description here relates to the method of attenuating $t_s$ when the events are misaligned. The signal $|t_s|t_d$ could likewise be used as an automatic volume control signal which would cause a boost in the value of $t_1$ when the events are aligned and little or no boost in the value of $t_1$ when the events are misaligned.

Figure 7:
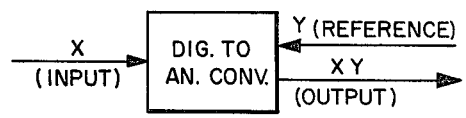
FIG. 7 shows one means useful in obtaining a product of two values.

When switches $s_1$ and $s_2$ are operated to position 2, the value $|t_s|t_d$ from multiplier 45 is applied to the input 60 of adjustable exponent circuit 51. An adjustable exponent circuit 51 can be any simple well known nonlinear circuit such as a diode. When the $|t_s|t_d$ is passed through adjustable component circuit 51, the value is raised to some exponent such as, for example, 1.5 or 2, thereby accentuating or emphasizing to an even greater extent the difference between the aligned and the misaligned events on traces 1–2–3 . . . n. The output, of course, from circuit 51 is applied to input 53 of multiplier 50 where it is multiplied with the incoming average of the traces $t_s$ and plotted on plotter 70. The multipliers 45 and 50 can be any simple device such as that shown in FIG. 7, thus one input would constitute "x" and the other input would constitute "y," and the multiplied output would constitute "xy." The multiplier shown here is shown and discussed in the articles previously discussed.

Referring to FIGS. 5A and 5B, an example of processing standard CDP data, and data as described in this specification are illustrated respectively. In FIG. 5B the circuit as shown in FIG. 4 was used with switch $s_1$ in position 2 and adjustable component circuit 51 set so that "$p$"=1.5. Viewing FIG. 5B, one can see that the coherent events have much better stand-out from this invention than from a conventional CDP composite.

All of the discussion up to now has principally dealt with the processing of information taken in a manner shown in FIG. 1, i.e., using data from a common basement point. It is obvious, of course, that information can be obtained and plotted successfully if the dip is known and taken into consideration. Therefore, instead of setting the heads 25 in a manner to pick up the information across drum 27 in a perfectly straight line so that the heads 25 will select principally the aligned events, the heads can be offset by the amount of the dip by rotating the heads around the drum in a manner so that the difference between the aligned heads and the new position of the heads represents in time, the misalignment of the event due to the dip in the strata.

It is also obvious, of course, that digital processing systems are extremely well adapted to the processing of data shown above and that the summing, obtaining of differences, reciprocal and absolute values, and multiplications necessary to fulfill the steps of this invention are capable of being done in a simple manner on the digital computer.

What is claimed is:

1. Method for enhancing the coherent events between related traces comprising:
   (a) dividing each of said related traces into sequential time sample points;
   (b) determining the arithmetical mean amplitude of the related trace events at one of said time sample points;
   (c) subtracting the value of each of the related trace events from said arithmetical mean amplitude;
   (d) adding the absolute values of said resultant value from step (c);
   (e) obtaining the reciprocal of step (d);
   (f) applying the value obtained in step (e) as a gain function for proportional alteration of said arithmetical mean amplitude of each of said related traces at said sequential time sample points, whereby the events which were coherent at said sampled time will be emphasized and said incoherent events will be de-emphasized.

2. A method as described in claim 1, wherein said reciprocal value in step (e) is determined by the expression:

$$(d_j)^{-p}$$

where: $d_j$=said subtraction value at time sampling point (j); and $p$=any selected numerical value $>0$.

3. A method of seismic prospecting comprising sequentially transmitting a plurality of seismic signals into the ground at a plurality of spaced points, receiving said plurality of transmitted signals at a spaced location from said transmitted signals, separately recording said plurality of received signals on a reproducible record medium as plural traces, reproducing said plural traces from said reproducible record medium and determining the arithmetical mean of said reproduced plural traces at sequential time sample points, subtracting the amplitude of each trace at said time sample points from said determined arithmetical mean, deriving the absolute value per trace for said sample point of each trace, adding the absolute values per trace and obtaining the reciprocal of said addition, and applying the value of said reciprocal as a gain function to said arithmetical mean trace value, and recording the resultant mean trace value
   whereby said arithmetical mean trace value will be enhanced when the reciprocal is a small value and attenuated when said reciprocal is a large value.

4. A method as described in claim 3 wherein said reciprocal value is determined in accordance with the following expression:

$$(d_j)^{-p}$$

where: $d_j$ = said subtraction value at time sampling point (j) and $p$ = any selected numerical value $>0$.

5. A method of seismic prospecting utilizing 1, 2 ... nth detector and receiving means and plural recording means for recording 1, 2 ... nth related traces comprising the steps of:
   (a) Recording 1st, 2nd ... nth signals from said 1, 2–nth receiving means;
   (b) adjusting event placement on each of said 1, 2 ... nth records versus time to account for detector placement and seismic signal location;
   (c) dividing each of said 1, 2 ... nth time corrected signals into sequential time sample points;
   (d) determining the arithmetic mean amplitude of the 1, 2 ... nth time corrected signals at one of said time sample points;
   (e) subtracting the value of each of the 1, 2 ... nth time corrected signals from said arithmetical mean amplitude time corrected signals;
   (f) adding the absolute values of said resulting value from step (e);
   (g) obtaining the reciprocal of step (f);
   (h) applying the value obtained in step (g) as a gain function for proportional alteration of said arithmetical mean amplitude of the 1, 2 ... nth traces at said sequential time sample point, whereby the events which were coherent at said sampled time will be emphasized and said incoherent events will be deemphasized.

6. A seismic exploration method comprising:
   (a) sequentially transmitting and receiving a series of seismic signals, each of of said transmitted and received signals having a different physical placement but being oriented to cause a seismic reflection to be received from substantially the same basement location;
   (b) recording the signals so received as plural traces on a separate recording mechanism;
   (c) converting said traces to electrical trace values;
   (d) adding each of said converted electrical trace values in a manner to determine the arithmetical mean of said trace values;
   (e) plotting said added trace values by carrying the amplitude of said trace values to be plotted in accordance with the expression:

$$O_j = |S_j| \, |d_j|^{-p}$$

where
   $O_j$ = the value used to vary the amplitude of said plotted trace value at a selected time sampling point (j), $|S_j|$ = absolute value of the sum of said trace values at said selected time sampling point (j),
   $|d_j|$ = the difference between the amplitude of said trace value at time sampling point (j) and the arithmetic means of said trace values at time sampling point (j), and
   $p$ = any real number greater than zero.

7. A method as described in claim 6 where $p$ is equal to or greater than 1.

8. A method of enhancing recorded and related plural seismic traces comprising:
   (a) removing the effects of time displacement of events caused by transmitter or detector placement;
   (d) dividing said related seismic traces derived from step (a) into sequential time sampling points;
   (c) determining the arithmetical means of the amplitude of the events on said traces at a selected time sampling point;
   (d) plotting said determined arithmetical mean by varying the amplitude of the mean values to be plotted by increasing the amplitude when the algebraic amplitudes of the events are coherent, and decreasing the amplitudes when the algebraic amplitudes of said events lack coherence.

9. A method as described in claim 8 wherein said arithmetic means to be plotted is increased or decreased in accordance with the expression:

$$O_j = |S_j| \, |d_j|^{-p}$$

where $O_j$ = the value used to determine the increase or decrease of said mean value to be plotted;
   $|S_j|$ = absolute value of the algebraic sum of the amplitude of said plural seismic traces at selected time sampling point (j);
   $|d_j|$ = absolute value of the algebraic difference between the algebraic value of said arithmetic mean of events of all of said traces at said time sampling point (j) and each of the algebraic amplitudes of an event of a trace at time sampling point (j); and
   $p$ = any real number greater than zero.

References Cited

UNITED STATES PATENTS 2,902,107   9/1959   Erath et al. _____ 340—15.5 X
2,934,741   4/1960   Gray et al. _____ 340—15.5

RICHARD A. FARLEY, Primary Examiner

DANIEL C. KAUFMAN, Assistant Examiner